(12) United States Patent
Hipshier et al.

(10) Patent No.: US 8,235,567 B2
(45) Date of Patent: Aug. 7, 2012

(54) ILLUMINATED INTERIOR TRIM COMPONENT

(75) Inventors: Jason M. Hipshier, Hudsonville, MI (US); Nels Smith, Zeeland, MI (US); Jeffrey T. Stout, Grand Rapids, MI (US); Scott A. Hansen, Holland, MI (US); Ronald A. Bozio, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 335 days.

(21) Appl. No.: 12/623,175

(22) Filed: Nov. 20, 2009

(65) Prior Publication Data

US 2010/0128493 A1      May 27, 2010

Related U.S. Application Data

(60) Provisional application No. 61/117,419, filed on Nov. 24, 2008.

(51) Int. Cl.
     *F21V 33/00*      (2006.01)

(52) U.S. Cl. ......... 362/488; 362/154; 362/501; 362/511
(58) Field of Classification Search .................. 362/137, 362/154, 155, 488, 501, 510, 511, 558; 296/37.7, 296/37.8
See application file for complete search history.

(56) References Cited

U.S. PATENT DOCUMENTS

| | | | |
|---|---|---|---|
| 6,739,742 B2 * | 5/2004 | Gehring et al. | 362/154 |
| 7,766,525 B2 * | 8/2010 | Rosenbauer et al. | 362/551 |
| 2004/0130174 A1 * | 7/2004 | Laskey | 296/37.7 |
| 2009/0175049 A1 * | 7/2009 | Lota | 362/488 |
| 2010/0067221 A1 * | 3/2010 | Beckley et al. | 362/155 |

* cited by examiner

*Primary Examiner* — Y My Quach Lee
(74) *Attorney, Agent, or Firm* — Fletcher Yoder P.C.

(57) ABSTRACT

A lighting system is provided that includes an interior trim component having a light transmissive element. The interior trim component is configured to move between a first position and a second position. The vehicle lighting system also includes a light source optically coupled to the light transmissive element at least while the interior trim component is located in the first position. The light source is configured to illuminate a region of a vehicle interior.

14 Claims, 10 Drawing Sheets

ILLUMINATED INTERIOR TRIM COMPONENT

CROSS REFERENCE TO RELATED APPLICATION

This application claims priority from and the benefit of U.S. Provisional Application Ser. No. 61/117,419, entitled "MOVABLE COMPONENT WITH INTEGRATED LIGHTING", filed Nov. 24, 2008, which is hereby incorporated by reference in its entirety.

BACKGROUND

The invention relates generally to an illuminated interior trim component.

Storage compartments may be positioned throughout an interior of a vehicle to store cargo and other small items. For example, an overhead console may include a storage compartment suitable for storing sunglasses, driving glasses, or other items. Other storage compartments may be located within a center console, an armrest, seats, door panels, or other areas of the vehicle interior. Certain storage compartments include a door configured to secure the contents of the compartment and/or hide the contents from view.

While certain storage compartments include lighting to illuminate an interior of the storage compartment, such lighting is typically not visible when the storage compartment door is in a closed position. Consequently, a driver or passenger within the vehicle may experience difficulty locating the storage compartment in low light conditions (e.g., driving at night). As a result, a driver may become distracted while attempting to locate a dark storage compartment. Unfortunately, employing supplementary lighting to illuminate the storage compartment door will increase vehicle cost due to the extra components associated with providing an additional light source and electrical connections.

BRIEF DESCRIPTION OF THE INVENTION

The present invention relates to a vehicle lighting system including an interior trim component having a light transmissive element. The interior trim component is configured to move between a first position and a second position. The vehicle lighting system also includes a light source optically coupled to the light transmissive element at least while the interior trim component is located in the first position. The light source is configured to illuminate a region of a vehicle interior.

The present invention also relates to a storage compartment including a door configured to transition between an open position and a closed position. The storage compartment also includes a light transmissive element coupled to the door. The light transmissive element is configured to receive light from an interior of the storage compartment and to illuminate an exterior surface of the door. The storage compartment further includes a light source disposed within the storage compartment and configured to illuminate the interior of the storage compartment. The light source is positioned to optically communicate with the light transmissive element at least while the door is in the closed position.

The present invention further relates to a storage compartment including a door configured to transition between an open position and a closed position, and a light transmissive element coupled to the door. The light transmissive element comprises an interior surface facing an interior of the storage compartment and an exterior surface visible from a vehicle interior. The light transmissive element is configured to transmit light from the interior surface to the exterior surface. The storage compartment also includes a light source coupled to the door. The light source is in optical communication with the interior surface of the light transmissive element, and the light source is configured to illuminate the interior of the storage compartment.

DETAILED DESCRIPTION

Figure 1:
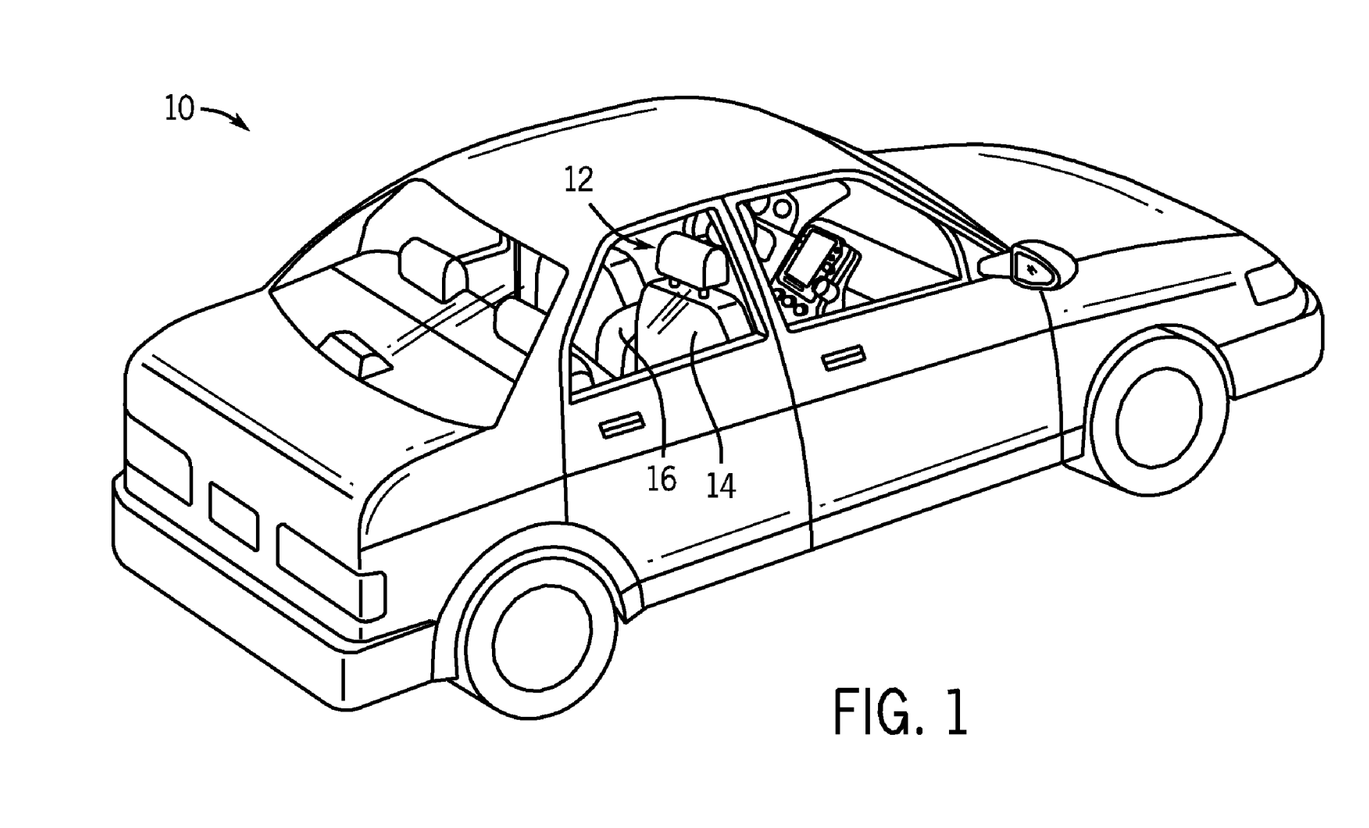
FIG. 1 is a perspective view of an exemplary vehicle that may include a lighting system configured to illuminate a region of the vehicle interior and to enhance visibility of an interior trim component with a light source.

FIG. 1 is a perspective view of an exemplary vehicle 10, including an interior 12 having seats 14 and a center console 16. As discussed in detail below, the center console 16 and/or other areas within the interior 12 may include a lighting system configured to illuminate a region of the interior 12 and enhance visibility of an interior trim component with a single light source. For example, the vehicle 10 may include a storage compartment having a door configured to transition between an open position and a closed position. The storage compartment door may include a light transmissive element configured to receive light from an interior of the storage compartment and transmit the light to an exterior surface of the door, thereby enhancing the visibility of the storage compartment. A light source disposed within the storage compartment is configured to illuminate the interior of the storage compartment, and to provide light to the light transmissive element, at least while the door is in the closed position. In this manner, a single light source may both illuminate the interior of the storage compartment and enhance visibility of the storage compartment door. In certain configurations, the intensity of the light source may vary based on the position of the door. For example, while the door is in the closed position, the light source may emit a minimum lighting intensity such that light passing through the light transmissive element increases visibility of the door without distracting vehicle occupants. However, once the door is opened, the light source may emit a maximum lighting intensity to illuminate the interior of the storage compartment.

In an alternative embodiment, the light source may be coupled to the storage compartment door. Similar to the previously described embodiment, a light transmissive element may be coupled to the storage compartment door to transmit light from the interior of the storage compartment to the exterior surface of the door. However, in the alternative embodiment, the light source is coupled to the door, thereby providing light to the light transmissive element regardless of door position. The light source also serves to illuminate the interior of the storage compartment. Because the light source is coupled to the door, transitioning the door between the open and closed positions may alter the position of the light source relative to the interior of the storage compartment. The intensity of the light source may also vary in this configuration to provide additional light to the storage compartment interior when the door is in the open position. In certain embodiments, a variable resistor disposed onto a flexible circuit may serve to automatically vary lighting intensity based on the position of the door relative to the flexible circuit.

In a further embodiment, the center console 16, for example, includes a movable storage bin composed of a light transmissive material. In such an embodiment, the storage bin may be moved fore and aft within the center console 16. A light source positioned within the console may illuminate the storage bin while the storage bin is located at a first (e.g., fore) position. When the storage bin is translated to a second (e.g., aft) position, the light source may illuminate the exposed region of the console. Such a configuration may enhance the visibility of the storage bin and illuminate the interior of the console with a single light source, thereby reducing costs compared to configurations that employ individual light sources to illuminate each component.

Figure 2:
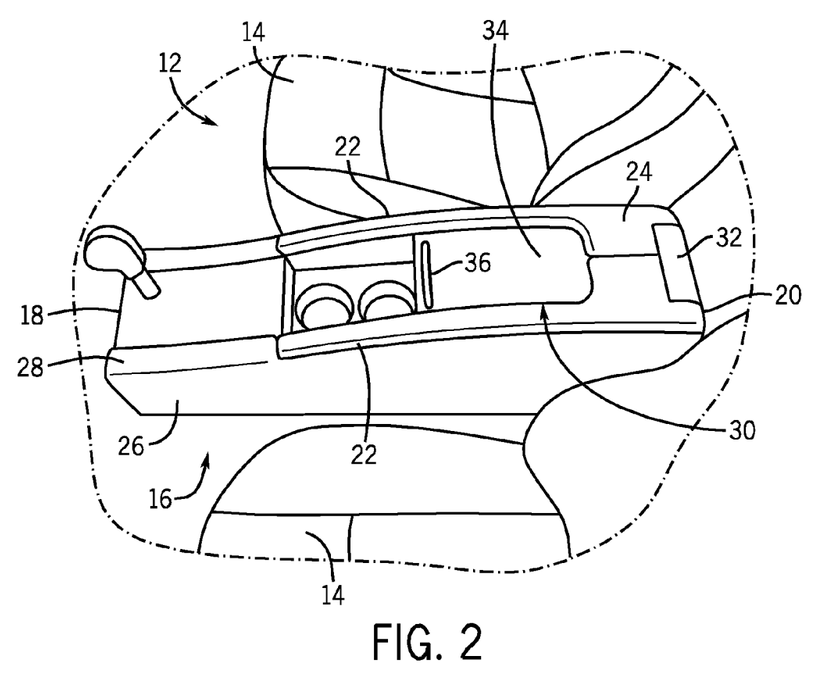
FIG. 2 is a perspective view of an exemplary center console that may be located within an interior of the vehicle of FIG. 1.

FIG. 2 is a perspective view of an exemplary center console 16 that may be located within an interior of the vehicle of FIG. 1. As discussed in detail below, the center console 16 may include a lighting system configured to illuminate an interior portion of the console and enhance visibility of an interior trim component with a single light source. As illustrated, the console 16 is coupled to a floor of the vehicle interior 12 between a driver seat 14 and a passenger seat 14. In the present configuration, the console 16 is configured to provide a storage area and an armrest for an occupant of one or both seats 14. The console 16 is generally prismatic, having a front wall 18, a rear wall 20, two opposed and generally symmetrical side walls 22 and a top surface 24.

The console 16 also includes two side panels 26 which form the main body of the console 16. In the present configuration, each side panel 26 provides one of the side walls 22 of the console 16 and portions of the rear wall 20, the front wall 18 and the top surface 24. As illustrated, the side walls 22 include a compound-curved upper contour having both convex and concave portions, thereby transitioning between the raised rear wall 20 and the lower front wall 18. The top edges 28 of the side panels 26 form the curved top surface 24. The top surface 24 includes an opening 30 that enables an occupant to access an interior of the console 16. In certain configurations, the console 16 includes a rear panel 32 forming a portion of the rear wall 20 and/or the top surface 24.

In the present configuration, the console 16 includes a door 34 configured to transition between an open position and the illustrated closed position. The door 34 includes a handle 36 that may enable an occupant to slide the door 34 between the two positions. As discussed in detail below, sliding the door 34 toward the open position will expose an interior of a storage compartment located within the console 16. In certain configurations, a light transmissive element disposed within the door 34 (e.g., within the handle 36) will transmit light from the interior of the storage compartment to an exterior surface of the door 34, at least while the door 34 is in the closed position. In this manner, visibility of the storage compartment may be enhanced during low light conditions (e.g., driving at night). Once the door 34 is transitioned to the open position, the same light source which provided light to the light transmissive element will illuminate the interior of the storage compartment. In this manner, the storage compartment may employ a single light source to illuminate both the storage compartment interior and exterior surface of the door, thereby decreasing construction costs compared to configurations that employ separate light sources to illuminate each region.

While the present lighting system is described with reference to the center console 16, it should be appreciated that alternative embodiments may employ similar lighting systems positioned throughout the interior 12 of the vehicle 10. For example, a storage compartment located within an overhead console, door panel, instrument panel, or other region of the interior 12 may include a door having a light transmissive element that is illuminated by the same light source that provides light to the interior of the storage compartment. Furthermore, as discussed in detail below, other moveable interior trim components, in addition to the doors described above, may utilize a similar lighting system. For example, the center console 16 may include a movable storage bin composed of a light transmissive material. A single light source may both illuminate the movable storage bin and provide light to an interior of the center console 16. By utilizing a single light source to enhance the visibility of an interior trim component and illuminate a region of the vehicle interior 12, the present lighting system may reduce manufacturing costs compared to configurations employing multiple light sources.

Figure 3:
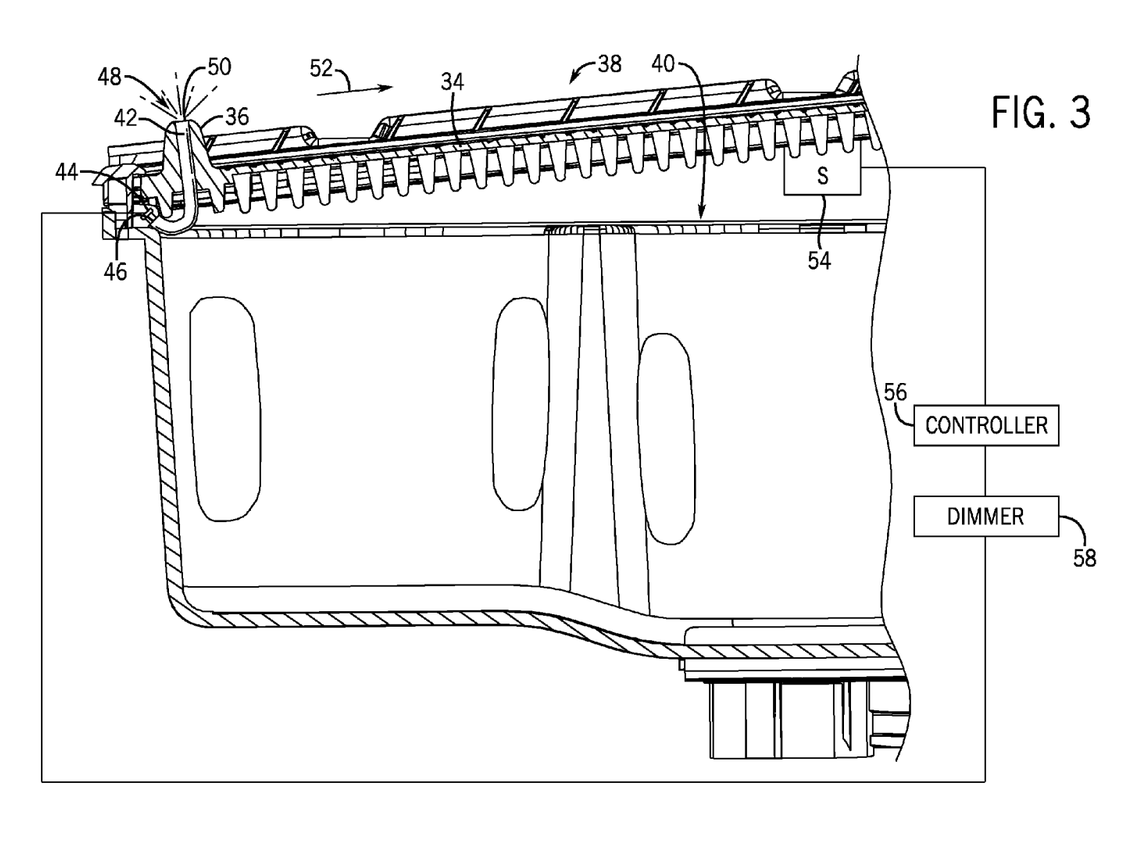
FIG. 3 is a cross-sectional view of a first embodiment of a storage compartment having a fixed light source and a light transmissive element disposed within a handle of a storage compartment door.

FIG. 3 is a cross-sectional view of a first embodiment of a storage compartment having a fixed light source and a light transmissive element disposed within a handle of a storage compartment door. As illustrated, the storage compartment 38 includes an interior volume 40 enclosed by the door 34. As previously discussed, the door 34 includes the handle 36 configured to facilitate movement of the door 34 between an open position and a closed position. As will be appreciated, alternative embodiments may employ other components (e.g., knobs, release buttons, etc.) in place of the handle 36 to control movement of the door 34. As illustrated, the handle 36 includes a light transmissive element 42 configured to illuminate the handle 36. Specifically, in the present embodiment, a light source 44 (e.g., light emitting diode (LED), incandescent bulb, fluorescent bulb, etc.) disposed within the storage compartment 38 is configured to both illuminate the interior 40 of the storage compartment 38 and enhance visibility of the handle 36 in low light conditions. While the door 34 is in the illustrated closed position, an interior surface 46 of the light transmissive element 42 is optically coupled to the light source 44. Therefore, while the door is closed, light from the light source 44 passes through the light transmissive element 42 and is emitted from an exterior surface 48. Consequently, visibility of the door handle 36 may be enhanced such that a driver or passenger within the vehicle 10 may readily identify the storage compartment 38 in low light conditions (e.g., driving at night).

While the light transmissive element 42 is located within the handle 36 in the present embodiment, it should be appreciated that the light transmissive element 42 may be positioned within any suitable region of the storage compartment door 34. For example, the light transmissive element may be disposed within the center or edge of the door 34. As will be appreciated, in such embodiments, the light source 44 may be relocated such that the light source 44 and the light transmissive element 42 are in optical communication. Furthermore, it should be appreciated that the light transmissive element 42 may be formed into any suitable shape. For example, in the present embodiment, the light transmissive element 42 may conform to the shape of the handle 36 such that the entire handle 36 is illuminated. In alternative embodiments, the light transmissive element may extend around the perimeter of the door 34 to highlight the shape of the door in low light conditions. In addition, the exterior surface 48 of the light transmissive element 42 may be coated with a reflective material 50 to enhance visibility of the storage compartment in daylight conditions. For example, the handle may include a chrome coating over the light transmissive element 42. Such a coating may be configured to facilitate light passage from the light source 44 to maintain visibility of the handle 36 in low light conditions.

As will be appreciated, the light transmissive element 42 may be composed of any suitable transparent or translucent material. For example, the light transmissive element 42 may be formed from glass or plastic, such as polycarbonate. The light transmissive element 42 may be substantially transparent to enhance the brightness of the exterior surface 48. Alternatively, the light transmissive element 42 may be translucent to diffuse the light emitted from the light source 44. In certain embodiments, the light transmissive element 42 may be tinted to provide a desired color to the exterior surface 48. For example, the tint color may be selected to match the illumination color of the vehicle interior lighting.

In addition to enhancing the visibility of the handle 36, the light source 44 is configured to illuminate the interior 40 of the storage compartment 38 when the door 34 is in the open position. In the present embodiment, the door 34 is configured to translate in the direction 52, thereby exposing the storage compartment interior 40. While a flexible tambour door 34 is employed in the present embodiment, it should be appreciated that other door configurations (e.g., rigid sliding doors) may be employed in alternative embodiments. As discussed in detail below, a tambour door includes multiple segments configured to rotate with respect to one another, thereby enabling the door to translate along curved openings. In further embodiments, the door may be configured to rotate about a hinge to transition between the closed and open positions. Certain doors may include a push-to-release mechanism to disengage the door from the closed position. As previously discussed, the light transmissive element 42 may be positioned within any suitable area of these door configurations.

Figure 4:
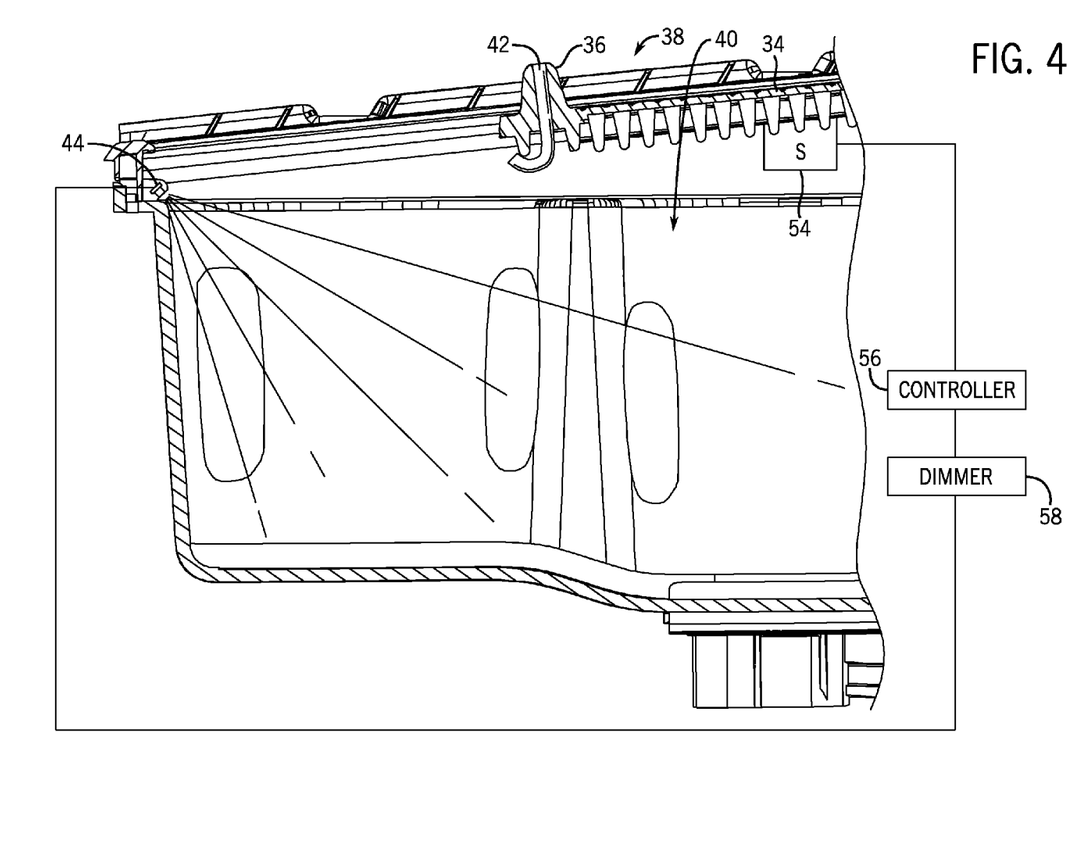
FIG. 4 is a cross-sectional view of the storage compartment shown in FIG. 3, in which the storage compartment door is in a partially open position.

FIG. 4 is a cross-sectional view of the storage compartment shown in FIG. 3, in which the storage compartment door is in a partially open position. As illustrated, once the door 34 translates in the direction 52, the light transmissive element 42 may no longer optically communicate with the light source 44. Consequently, the light emitted from the exterior surface 48 of the light transmissive element 42 may substantially decrease once the door 34 is transitioned away from the closed position. However, once the door 34 opens, the interior 40 of the storage compartment 38 will be exposed, thereby enabling an occupant to see the storage compartment interior 40, as illuminated by the light source 44. In certain configurations, the luminous intensity of the light source 44 may increase as the door 34 transitions to the open position. For example, while the door 34 is in the closed position, the light source 44 may emit a minimum lighting intensity such that light passing through the light transmissive element 42 increases visibility of the door 34 without distracting vehicle occupants. However, once the door 34 is opened, the light source 44 may emit a maximum lighting intensity to illuminate the interior 40 of the storage compartment 38.

The present embodiment includes a door position sensor 54, a controller 56 and a dimmer 58 configured to regulate the intensity of the lighting. Specifically, the sensor 54 is configured to monitor the position of the door 34 with respect to the storage compartment 38 and transmit a signal to the controller 56 indicative of door position. In certain embodiments, the sensor 54 may be an electromechanical switch configured to engage upon movement of the door 34 away from the fully closed position. Alternatively, the switch may be activated only when the door reaches the fully opened position. Alternative sensors, such as capacitance sensors, field effect sensors, ultrasonic transducers, radio frequency transducers, optical transducers, among others, may be employed in further embodiments. The controller 56 is configured to determine the position of the door 34 based on the signal from the sensor 54. The controller 56 may be configured to select a predetermined lighting level based on the position of the door 34. For example, the controller 56 may select a minimum lighting intensity when the door is in the closed position and a maximum lighting intensity when the door is in the open position. The controller 56 may also gradually transition the lighting level between the two intensities as the door 34 translates in the direction 52. The controller 56 may then output a signal to the dimmer 58 indicative of the desired lighting level. The dimmer 58 is configured to adjust the intensity of the light source 44 based on the controller signal. In this manner, the light source may both illuminate the light transmissive element 42 with a low intensity light when the door 34 is in the closed position, and illuminate the interior 40 of the storage compartment 38 with a high intensity light when the door 34 is in the open position. However, it should be appreciated that alternative embodiments may omit the sensor 54, controller 56 and/or the dimmer 58, such that a constant luminous intensity is emitted by the light source 44.

Figure 5:
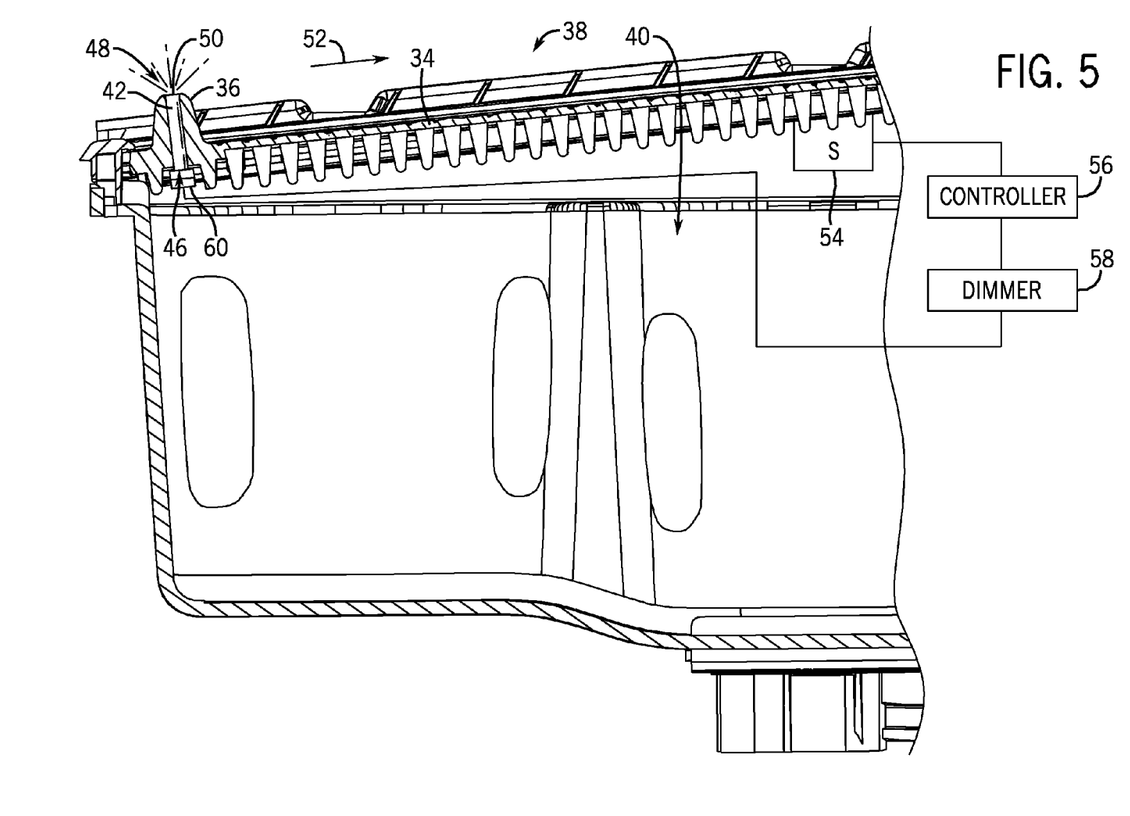
FIG. 5 is a cross-sectional view of a second embodiment of a storage compartment having a light source coupled to the storage compartment door.

FIG. 5 is a cross-sectional view of a second embodiment of a storage compartment having a light source coupled to the storage compartment door. As illustrated, the present embodiment employs an alternative light source 60 coupled to the storage compartment door 34 adjacent to the light transmissive element 42. In the illustrated position, the light source 60 is optically coupled to the interior surface 46 of the light transmissive element 42 regardless of the door position. As a result of this arrangement, the exterior surface 48 of the light transmissive element 42 may be illuminated throughout the range of motion of the storage compartment door 34. However, as the door 34 translates with respect to the storage compartment 38, the light source 60 may illuminate varying regions of the storage compartment interior 40. In certain embodiments, the light source may be configured to emit a luminous intensity sufficient to provide light to the entire interior regardless of the light source position.

As will be appreciated, because the light source 60 moves with respect to the storage compartment 38, a flexible circuit may be employed to provide electricity to the light source 60. In such a configuration, the flexible circuit may be configured to accommodate repeated movement of the door 34 without interruption of electrical power to the light source 60. As previously discussed, other door configurations (e.g., rigid sliding door, rotating door, etc.) may be employed in alternative embodiments. In such embodiments, the light source may be coupled to the light transmissive element 42 within the door 34 in a similar manner to the illustrated embodiment, thereby illuminating the exterior surface 48 of the light transmissive element 42 and providing light to the interior 40 of the storage compartment 38. While the present light source 60 is positioned adjacent to the handle 36, it should be appreciated that alternative embodiments having the light transmissive element 42 positioned in another area of the door 34 will include a light source 60 positioned adjacent to the light transmissive element 42.

Figure 6:
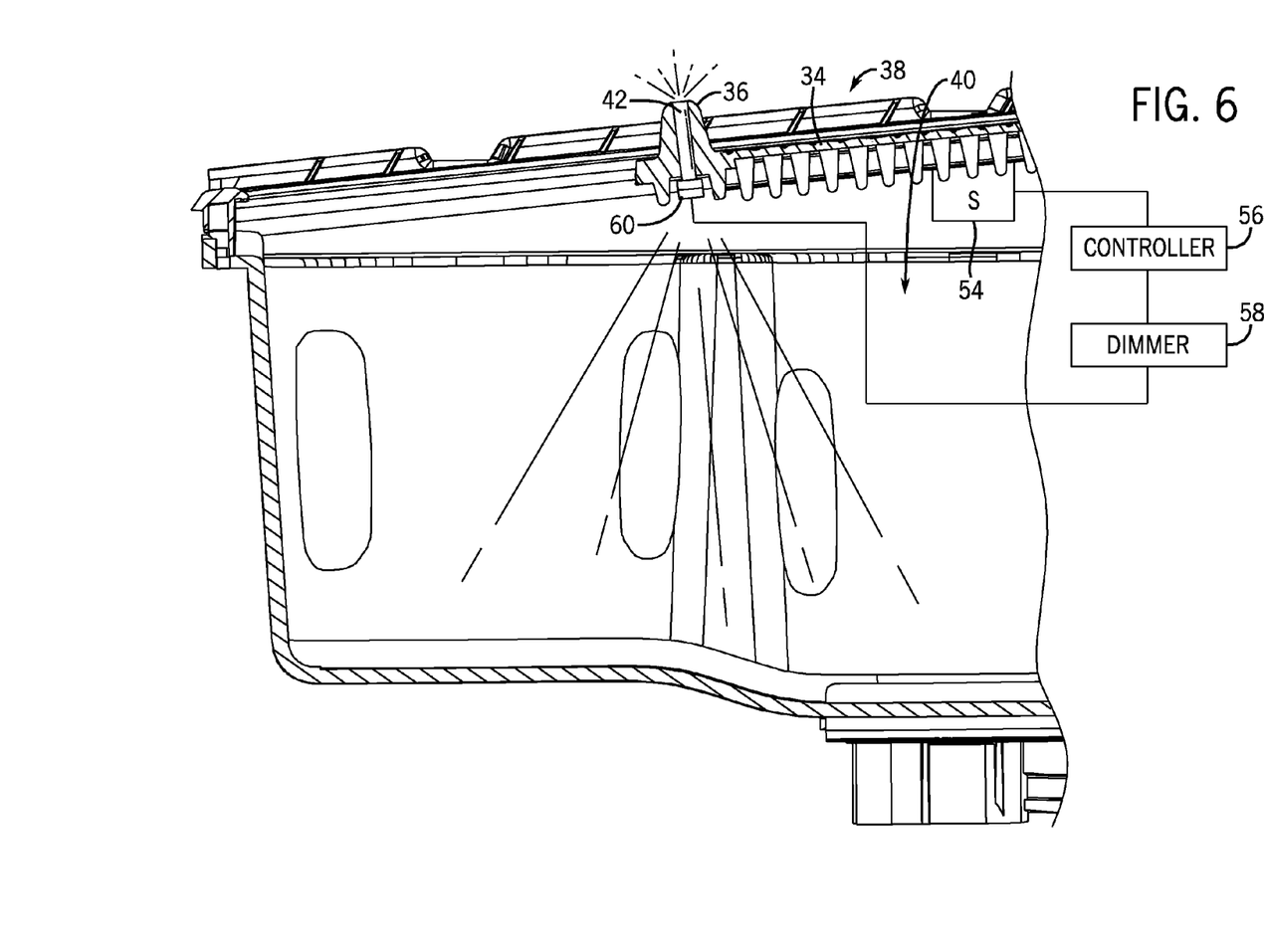
FIG. 6 is a cross-sectional view of the storage compartment shown in FIG. 5, in which the storage compartment door is in a partially open position.

FIG. 6 is a cross-sectional view of the storage compartment shown in FIG. 5, in which the storage compartment door is in a partially open position. As illustrated, the light transmissive element 42 remains in optical communication with the light source 60 after the door 34 has translated in the direction 52. Consequently, the exterior surface 48 of the light transmissive element 42 may remain illuminated throughout the range of motion of the storage compartment door 34. In addition, while the position of the light source 60 moves with respect to the storage compartment 38, the interior 40 may remain illuminated by the light source 60. Similar to the embodiment described above employing a fixed light source 44, the present embodiment may utilize the sensor 54, the controller 56, and the dimmer 58 to vary the intensity of the light source 60 as the door 34 translates in the direction 52. For example, in certain embodiments, the controller 56 is configured to increase the luminous intensity of the light source as the door 34 moves toward the open position. In such embodiments, the light source may emit a minimum lighting intensity while the door is closed to illuminate the handle 36, and emit a maximum lighting intensity while the door is open to illuminate the interior 40 of the storage compartment 38. Such a configuration may facilitate identification of the storage compartment handle 36 when the door is in the closed position, while enhancing visibility of the storage compartment interior 40 when the door is in the open position. As previously discussed, certain embodiments may omit the sensor 54, controller 56 and/or dimmer 58, such that a constant luminous intensity is emitted by the light source 60.

Figure 7:
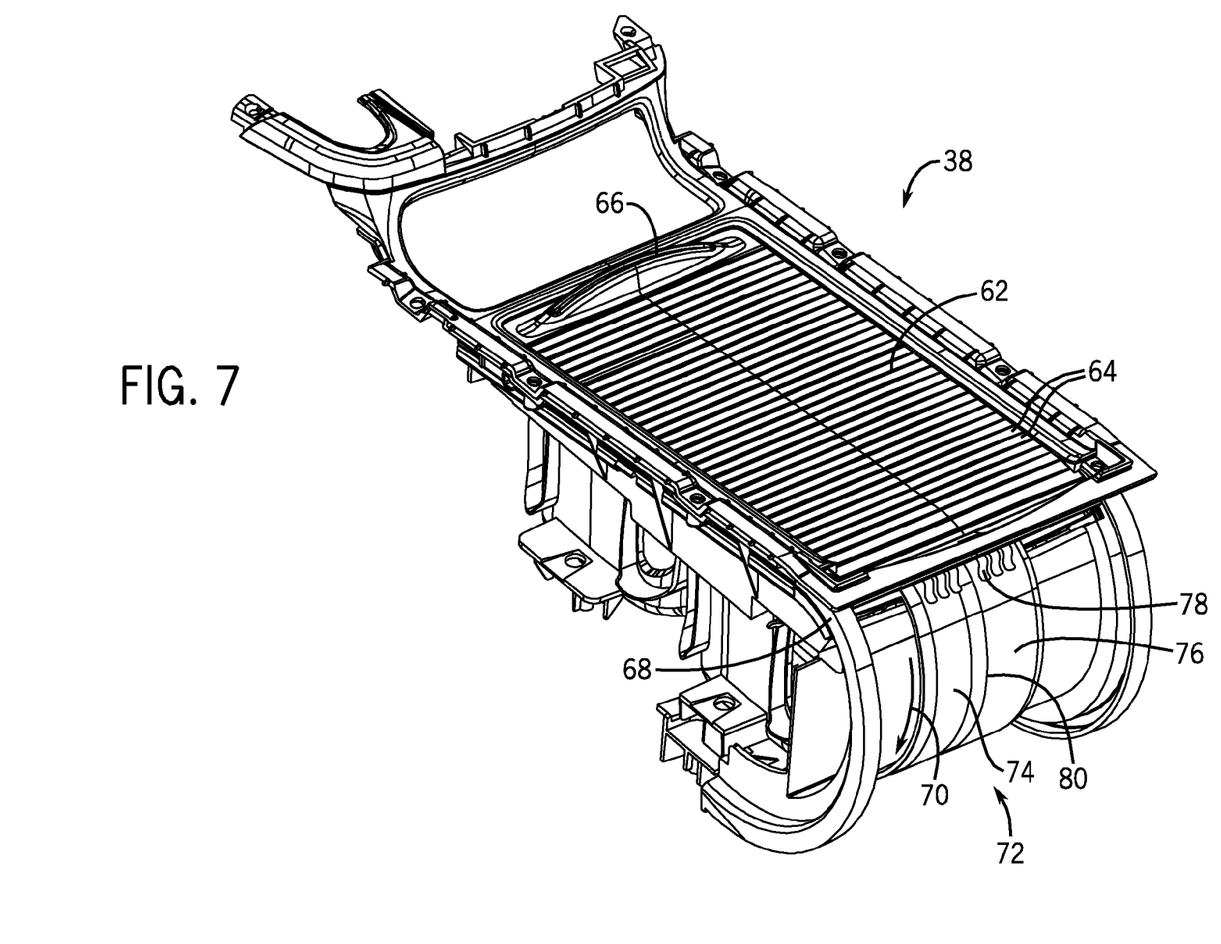
FIG. 7 is a perspective view of a third embodiment of a storage compartment having a tambour door and a flexible circuit configured to provide electrical power to the light source.

FIG. 7 is a perspective view of a third embodiment of the storage compartment 38 having a tambour door and a flexible circuit configured to provide electrical power to the light source. In the present embodiment, a flexible tambour door 62 is employed to enclose the storage compartment 38. The tambour door 62 includes a series of interlocked parallel ribs or segments 64 that may rotate with respect to one another. Such a configuration enables the tambour door 62 to match the contours of a curved storage compartment opening. Similar to the door 34 described above with reference to FIGS. 3 through 6, the tambour door 62 includes a handle 66. In certain configurations, the handle 66 includes a light transmissive element configured to convey light from the interior of the storage compartment 38 to the exterior surface of the handle 66, thereby enhancing the visibility of the storage compartment 38 in low light conditions. However, as will be appreciated, the light transmissive element may be located within other areas of the tambour door 62. For example, in certain embodiments, one or more segments 64 may be composed of a light transmissive material such that a light source within the storage compartment 38 illuminates the surface of the tambour door 62. In further embodiments, all of the segments 64 may be composed of a transparent or translucent material, thereby providing a tambour door 62 that is fully illuminated by the light source within the storage compartment 38.

As discussed in detail below, the tambour door 62 is configured to engage tracks within curved support elements 68. In this configuration, the tambour door 62 may be transitioned from the illustrated closed position to an open position by translating the door 62 in the direction 70. For example, a vehicle occupant may grasp the handle 66 and slide the tambour door 62 in the direction 70, thereby exposing the interior of the storage compartment 38. Similar to the previously described embodiments, a fixed light source may be disposed within the storage compartment 38 to illuminate the light transmissive element within the tambour door 62 and to provide light to the interior of the storage compartment 38. Alternatively, the light source may be coupled to the tambour door 62 adjacent to the light transmissive element. In such a configuration, the exterior surface of the light transmissive element may be illuminated throughout the range of motion of the tambour door 62. However, as the door 62 translates with respect to the storage compartment 38, the light source may illuminate varying regions of the storage compartment interior. In certain embodiments, the light source may be configured to emit a luminous intensity sufficient to provide light to the entire interior regardless of the light source position.

The present embodiment employs a flexible circuit 72 to deliver electrical power to the light source. Specifically, the flexible circuit 72 includes a first conductor 74 and a second conductor 76. In certain embodiments, the first conductor 74 is coupled to a vehicle electrical supply, and the second conductor 76 is coupled to the light source. A jumper 78 mounted to the tambour door 62 establishes an electrical connection between the two conductors 74 and 76. In this configuration, electrical power may be supplied to the light source regardless of tambour door position. In the present embodiment, a variable resistor 80 is disposed onto the second conductor 76 to provide varying electrical power to the light source. For example, the variable resistor 80 may be configured to provide increased resistance over its length. Consequently, when the tambour door 62 is located in the illustrated closed position, the variable resistor 80 may provide the greatest resistance. However, as the tambour door 62 translates in the direction 70, the electrical resistance will decrease due to the shorter circuit path along the variable resistor 80. As a result, the luminous intensity of the light source may increase as the tambour door 62 opens. In such a configuration, the light source may emit a minimum lighting intensity while the door 62 is in the closed position to limit driver distraction, and emit a maximum lighting intensity while the door 62 is in the open position to illuminate the interior of the storage compartment 38. As will be appreciated, variable resistors having other resistance profiles may be employed in alternative embodiments.

Figure 8:
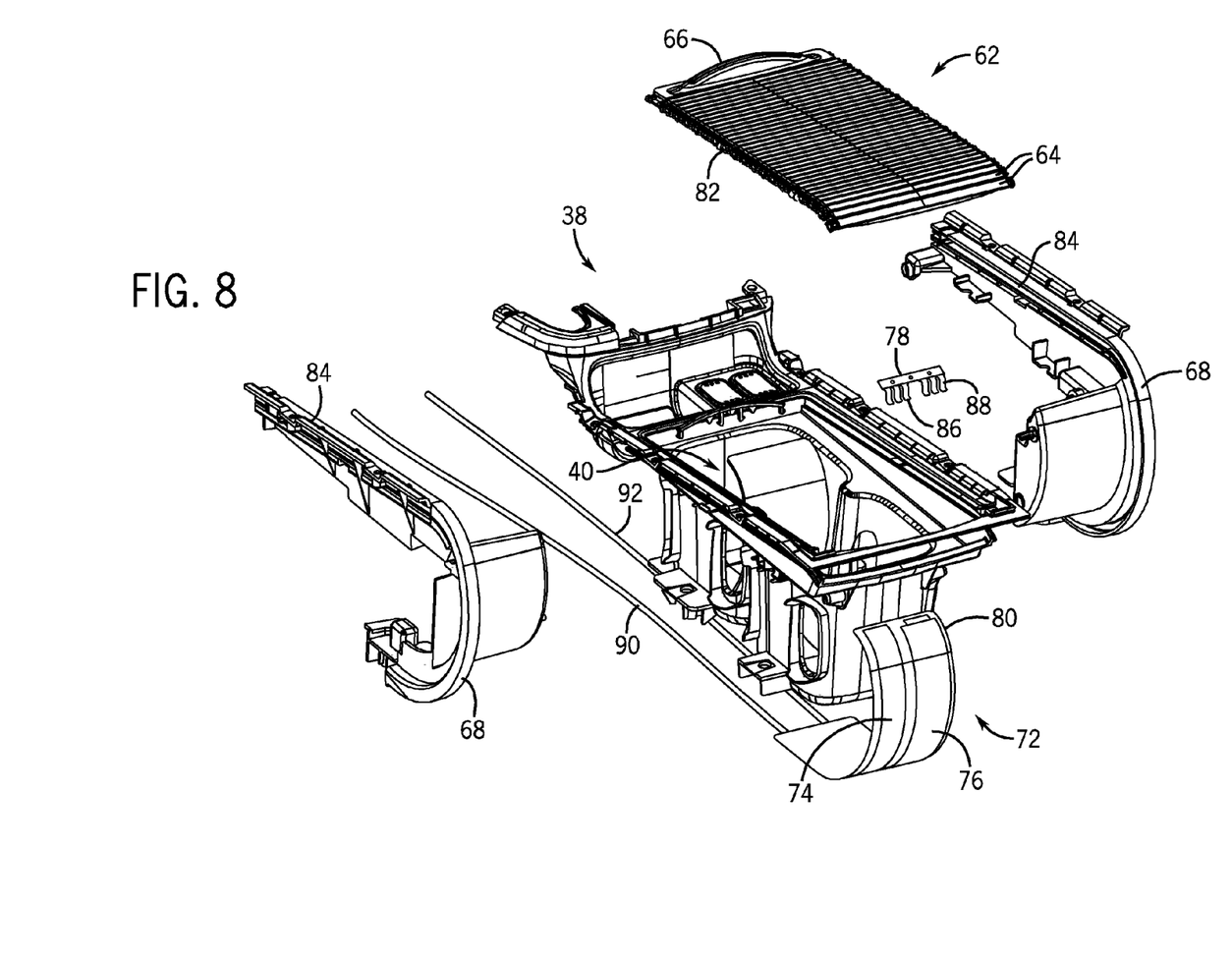
FIG. 8 is an exploded view of the storage compartment shown in FIG. 7.

FIG. 8 is an exploded view of the storage compartment shown in FIG. 7. As illustrated, each segment 64 of the tambour door 62 includes a protrusion 82 configured to engage a track 84 on the curved support elements 68. Because the tambour door segments 64 are configured to rotate with respect to one another, the tambour door may flex into a curved shape as the door 62 translates along the curved portion of the track 84. Consequently, the tambour door 62 may utilize less space in the open position compared to rigid doors that rotate and/or translate into the open position.

As illustrated, the jumper 78 includes a first contact 86 configured to engage the first conductor 74, and a second contact 88 configured to engage the second conductor 76. In the present embodiment, the jumper 78 is composed of a conductive material, such as copper, to establish a flow of electrical power between the first and second conductors 74 and 76. As illustrated, a first wire 90 is electrically coupled to the first conductor 74, and a second wire 92 is electrically coupled to the second conductor 76. As previously discussed, the first wire 90 may be connected to the vehicle electrical system to supply electrical power to the lighting system, while the second wire 92 is electrically coupled to the light source. Due to the connection established by the jumper 78, electricity may flow from the vehicle electrical system to the light source regardless of tambour door position.

In certain embodiments, the second wire 92 may be electrically coupled to a light source fixed within the storage compartment 38. In such a configuration, the tambour door 62 may include a light transmissive element configured to receive light from an interior of the storage compartment 38 and transmit the light to an exterior surface of the door, thereby enhancing the visibility of the storage compartment. The light source disposed within the storage compartment 38 is configured to illuminate the interior of the storage compartment 38, and to provide light to the light transmissive element, at least while the door 62 is in the closed position. In this manner, a single light source may illuminate the interior of the storage compartment 38 and enhance visibility of the tambour door 62. In an alternative embodiment, the second wire 92 may be electrically coupled to a light source attached to the tambour door 62. Similar to the previously described embodiment, a light transmissive element may be coupled to the tambour door 62 to transmit light from the interior of the storage compartment 38 to the exterior surface of the door 62. With the light source attached to the door 62, the light transmissive element may be illuminated regardless of door position.

Figure 9:
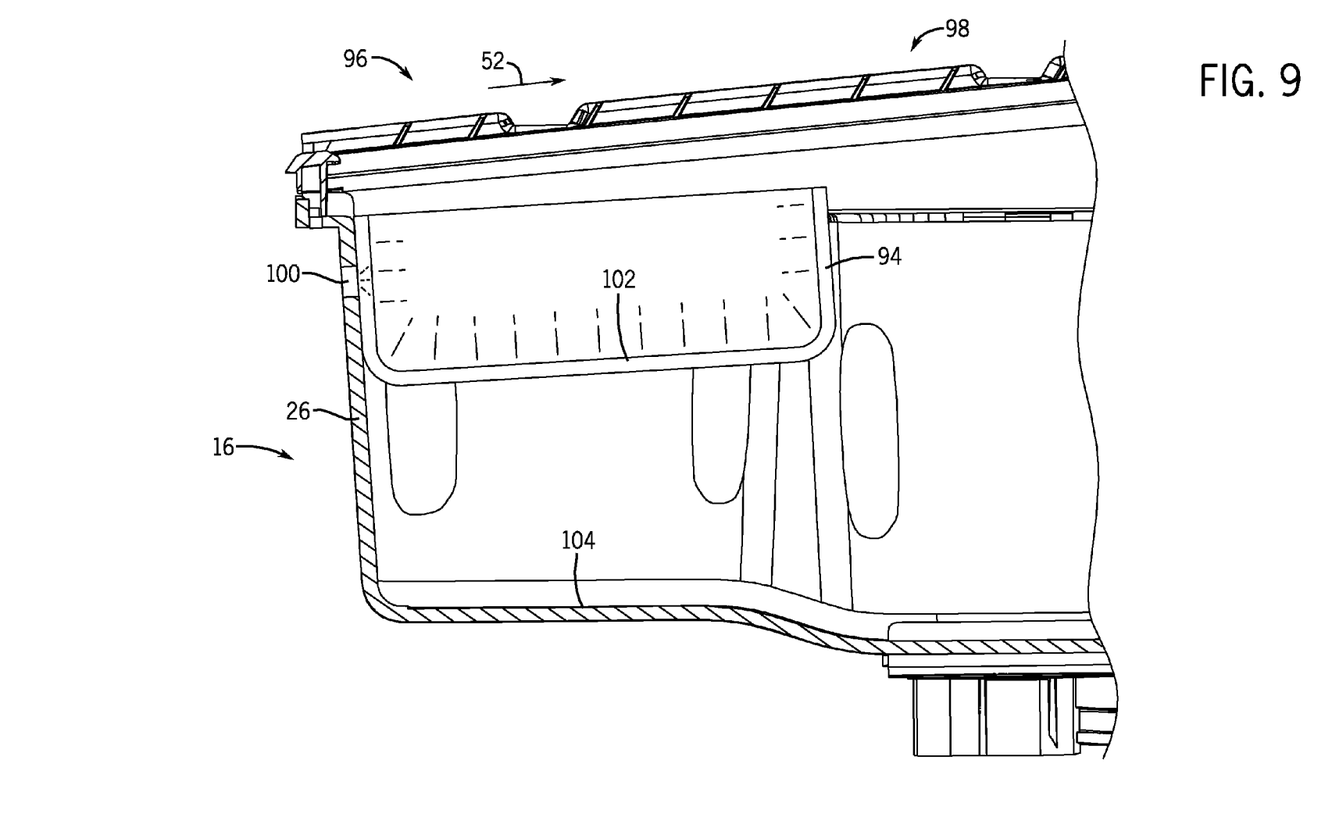
FIG. 9 is a cross-sectional view of a center console having a movable storage bin, in which the storage bin is constructed from a light transmissive material.

FIG. 9 is a cross-sectional view of the center console 16 having a movable storage bin 94, in which the storage bin 94 is constructed from a light transmissive material. In the present configuration, the storage bin 94 is configured to move between a front portion 96 and a rear portion 98 of the center console 16. For example, the center console 16 may include tracks or rails configured to interlock with the storage bin 94 to facilitate translation in the direction 52. However, as will be appreciated, alternative embodiments may employ other mechanisms to enable the storage bin 94 to translate within the center console 16. As illustrated, the storage bin 94 is positioned adjacent to a light source 100 located within the front portion 96 of the center console 16. Because a body 102 of the storage bin 94 is composed of a light transmissive material, light from the light source 100 may pass through the storage bin 94, thereby enhancing the visibility of the storage bin 94 in low light conditions (e.g., driving at night). Similar to the light transmissive element 42 described above, the storage bin body 94 may be composed of any suitable transparent or translucent material such as glass or plastic (e.g., transparent polycarbonate). In addition, the storage bin body 94 may be tinted to any desired color and/or coated with a desired finish (e.g., reflective coating). While the light source 100 is coupled to the side wall 26 in the present embodiment, it should be appreciated that the light source 100 may be located within other areas of the front portion 96, such as a bottom surface 104 of the center console 16.

As discussed in detail below, the light source 100 serves to both illuminate the storage bin 94 while the storage bin 94 is positioned within the front portion 96 of the center console 16, and to illuminate the interior of the center console 16 after the storage bin 94 has been moved in the direction 52. In this manner, a single light source 100 may illuminate the center console 16 while enhancing the visibility of the storage bin 94 to occupants within the vehicle interior 12. In alternative embodiments, the light source may be positioned within the rear portion 98 of the center console 16 to illuminate the storage bin 94 in an aft position.

Figure 10:
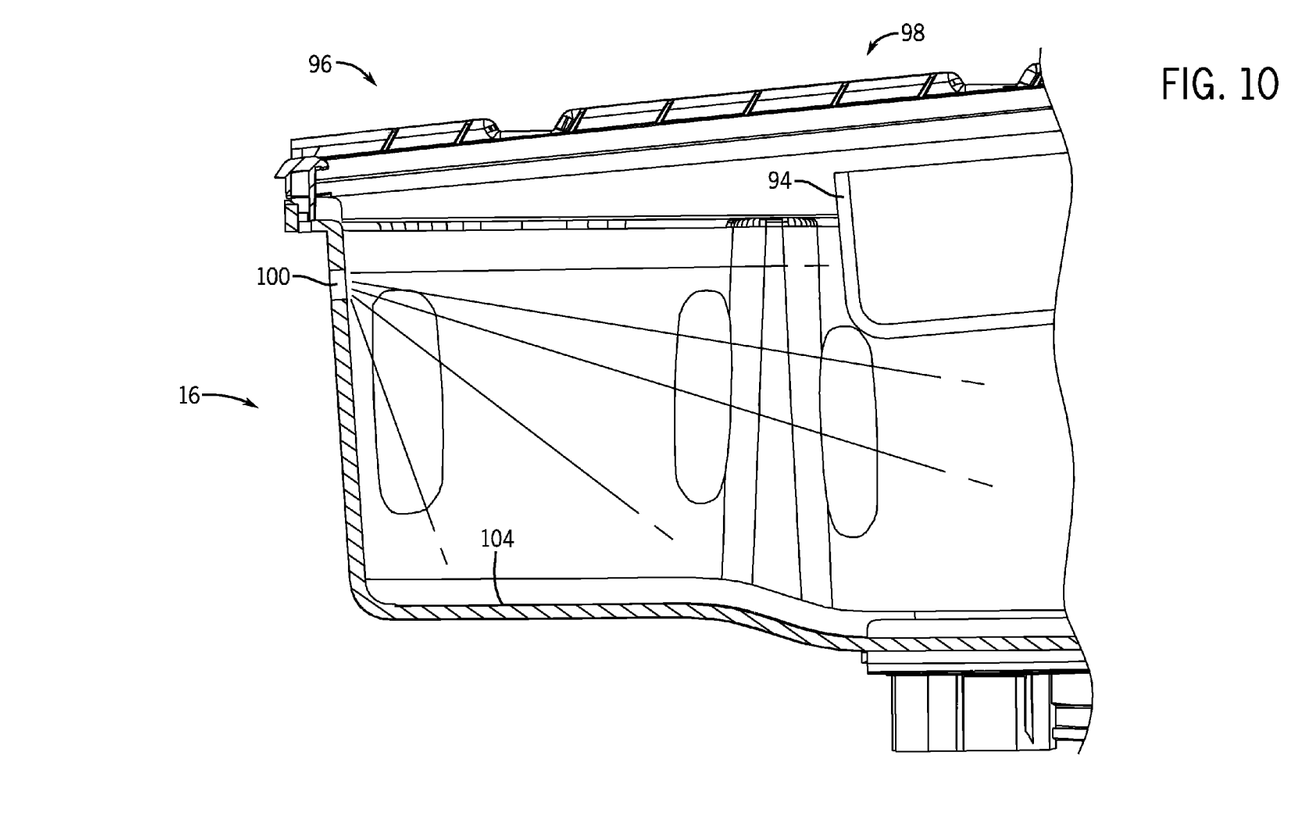
FIG. 10 is a cross-sectional view of the center console shown in FIG. 9, in which the storage bin is positioned non-adjacent to a light source.

FIG. 10 is a cross-sectional view of the center console shown in FIG. 9, in which the storage bin 94 is positioned non-adjacent to the light source 100. Specifically, as illustrated, the storage bin 94 is located within the rear portion 98 of the center console 16, after translation in the direction 52. In this position, the storage bin 94 may appear substantially darkened because it is no longer in optical communication with the light source 100. However, with the storage bin positioned within the rear portion 98 of the center console 16, the front portion 96 may be visible to occupants within the vehicle 10 due to illumination from the light source 100. In certain configurations, the light source 100 may provide sufficient light to illuminate the storage bin 94 and provide light to the entire center console 16 regardless of storage bin position. In further embodiments, the luminous intensity of the light source 100 may vary based on position of the storage bin 94. For example, in the illustrated configuration, the light source may emit a minimum intensity when the storage bin is located within the forward portion 96 and a maximum intensity when the storage bin is located within the rear portion 98. Such a configuration may facilitate identification of the storage bin 94 in low light conditions, while providing sufficient light to illuminate the center console interior.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle lighting system, comprising:
a storage compartment having an opening;
a door configured to transition between an open position and a closed position in which the door at least partially covers the opening of the storage compartment;
a light transmissive element disposed within a handle of the door, wherein the light transmissive element is configured to receive light from an interior of the storage compartment and to illuminate an exterior surface of the handle; and
a light source coupled to an interior surface of the storage compartment and configured to illuminate the interior of the storage compartment, wherein the light source is positioned to optically communicate with the light transmissive element at least while the door is in the closed position.

2. The vehicle lighting system of claim 1, wherein the door comprises a tambour door configured to slide between the open position and the closed position.

3. The vehicle lighting system of claim 1, wherein the light source is configured to vary lighting intensity based on position of the door.

4. The vehicle lighting system of claim 3, comprising:
   a dimmer configured to adjust the lighting intensity of the light source;
   a sensor configured to output a signal indicative of the position of the door; and
   a controller configured to instruct the dimmer to adjust the lighting intensity of the light source based on the signal.

5. The vehicle lighting system of claim 1, wherein the light source comprises a light emitting diode (LED).

6. The vehicle lighting system of claim 1, comprising a reflective coating disposed onto the light transmissive element, wherein the reflective coating is configured to facilitate light passage from the light transmissive element.

7. A vehicle lighting system, comprising:
   a tambour door configured to slide between an open position and a closed position in which the tambour door at least partially encloses a storage compartment;
   a light transmissive element coupled to the tambour door, wherein the light transmissive element comprises an interior surface facing an interior of the storage compartment and an exterior surface visible from a vehicle interior, and wherein the light transmissive element is configured to transmit light from the interior surface to the exterior surface;
   a light source coupled to the tambour door, wherein the light source is in optical communication with the interior surface of the light transmissive element, and wherein the light source is configured to illuminate the interior of the storage compartment; and
   a flexible circuit rigidly coupled to a body of the storage compartment, and a jumper coupled to the tambour door and configured to interface with the flexible circuit throughout a range of motion of the tambour door, wherein electrical power is delivered to the light source via contact between the flexible circuit and the jumper.

8. The vehicle lighting system of claim 7, wherein the light transmissive element is disposed within a handle of the tambour door.

9. The vehicle lighting system of claim 7, wherein the flexible circuit comprises a variable resistor configured to vary electrical power delivered to the light source based on position of the tambour door.

10. The vehicle lighting system of claim 9, wherein the variable resistor is configured to provide greater electrical power to the light source when the tambour door is in the open position than when the tambour door is in the closed position.

11. A vehicle lighting system, comprising:
    a door configured to transition between an open position and a closed position in which the door at least partially encloses a storage compartment;
    a light transmissive element coupled to the door, wherein the light transmissive element comprises an interior surface facing an interior of the storage compartment and an exterior surface visible from a vehicle interior, and wherein the light transmissive element is configured to transmit light from the interior surface to the exterior surface; and
    a light source coupled to the door directly between the interior surface of the light transmissive element and the interior of the storage compartment, wherein the light source is in optical communication with the interior surface of the light transmissive element, and wherein the light source is configured to illuminate the interior of the storage compartment.

12. The vehicle lighting system of claim 11, wherein the light transmissive element is disposed within a handle of the door.

13. The vehicle lighting system of claim 11, wherein the light source is configured to vary lighting intensity based on a position of the door.

14. The vehicle lighting system of claim 13, comprising:
    a dimmer configured to adjust the lighting intensity of the light source;
    a sensor configured to output a signal indicative of the position of the door; and
    a controller configured to instruct the dimmer to adjust the lighting intensity of the light source based on the signal.

* * * * *